US008282182B2

(12) United States Patent
Chandu et al.

(10) Patent No.: US 8,282,182 B2
(45) Date of Patent: Oct. 9, 2012

(54) CORRECTION OF PRINT ENGINE ARTIFACTS USING AN ITERATIVE HALFTONING SEARCH ALGORITHM

(75) Inventors: Kartheek Chandu, Longmont, CO (US); Larry M. Ernst, Longmont, CO (US); Nenad Rijavec, Longmont, CO (US); Mikel J. Stanich, Longmont, CO (US); Sreenath R. Vantaram, Rochester, NY (US); Chai W. Wu, Poughquag, NY (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 453 days.

(21) Appl. No.: 12/546,445

(22) Filed: Aug. 24, 2009

(65) Prior Publication Data

US 2010/0045722 A1    Feb. 25, 2010

Related U.S. Application Data

(60) Provisional application No. 61/090,935, filed on Aug. 22, 2008.

(51) Int. Cl.
*B41J 2/205* (2006.01)
*G06K 15/00* (2006.01)

(52) U.S. Cl. ......................................... 347/15; 358/3.06
(58) Field of Classification Search ...................... 347/15
See application file for complete search history.

(56) References Cited

U.S. PATENT DOCUMENTS 5,745,660 A * 4/1998 Kolpatzik et al. ............ 358/3.19
5,936,741 A * 8/1999 Burns ............................. 358/1.9
7,277,196 B2   10/2007 Van de Capelle
2005/0036705 A1   2/2005 Viassolo et al.
2006/0139670 A1   6/2006 Holblit et al.
2006/0256124 A1   11/2006 Kuo

OTHER PUBLICATIONS

Bhatt et al. "Direct Binary Search with Adaptive Search and Swap," Aug. 10, 2005.
David J. Lieberman et al., "A Dual Interpretation for Direct Binary Search and Its Implications for Tone Reproduction and Texture Quality," IEEE Transactions on Image Processing, vol. 9, No. 11, Nov. 2000.
Thrasyvoulos N. Pappas et al., "Least-Squares Model-Based Halftoning," IEEE Transactions on Image Processing, vol. 8, No. 8, Aug. 1999.
Jie Xu et al., "Artistic Thresholding," David R. Cheriton School of Computer Science University of Waterloo, 2008 ACM 978-1-60558-150-7/08/0006.

(Continued)

*Primary Examiner* — Uyen Chau N Le
*Assistant Examiner* — Hoang Tran
(74) *Attorney, Agent, or Firm* — Duft Bornsen & Fishman, LLP (57) ABSTRACT

Methods and systems herein provide for reducing artifacts during printing. One printing system is operable to prepare a continuous tone image (CTI) for printing onto a print medium by generating an initial half tone image (HTI) based on the CTI. The printing system includes a printer and a print controller. The print controller filters the initial HTI and the CTI with a perceptual filter and determines an error between the filtered CTI and the filtered HTI. The print controller prints the HTI via the printer to determine printer artifacts and processes a scanned version of the printed HTI to determine an error between the filtered CTI and the scanned and filtered HTI. This processing updates the initial HTI and reduces the error between the filtered CTI and the filtered HTI.

20 Claims, 5 Drawing Sheets

OTHER PUBLICATIONS

Jennifer R. Alford, "Qualitative Comparison of Visual Models Inr an Iterative Halftoning Procedure" Department of Electrical & Computer Engineering University of Iowa, Iowa City, IA 52242, 0-8186-7310-9/95 0 1995 IEEE.

* cited by examiner

CORRECTION OF PRINT ENGINE ARTIFACTS USING AN ITERATIVE HALFTONING SEARCH ALGORITHM

CROSS REFERENCE TO RELATED APPLICATIONS

This patent application claims priority to and thus the benefit of an earlier filing date from U.S. Provisional Patent Application No. 61/090,935 (filed Aug. 22, 2008), the entire contents of which are incorporated by reference.

BACKGROUND

1. Field of the Invention

The invention relates to the field of production printing systems and, in particular, to correcting or masking printer inherent artifacts of a print engine using an iterative halftoning search algorithm.

2. Statement of the Problem

Production printing systems associated with data processing enterprises generally include a localized print controller within the printing system. The print controller controls the overall operation of the printing system including, for example, host interfacing, interpretation or rendering, and lower level process control or interface features of print engines of the printing system. Host interaction may include appropriate adapters for coupling the printing system to one or more host systems that transmit print jobs to the printing system. The print jobs are generally encoded in the form of a page description language such as PostScript (PS), PCL, IPDS, etc.

In whatever form the print job may be encoded or formatted, the print controller within the printing system interprets the received information to generate sheetside bitmaps of the print job. The sheetside bitmaps represent the image to be printed on one side of a sheet of paper. Each sheetside bitmap generally comprises a 2-dimensional array of picture elements ("pixels", or PELs) that represent a corresponding formatted sheet of the print job. Each pixel may represent an encoded color value in accordance with the requirements of the particular print job encoding and the capabilities of the printing system on which the print job is to be printed.

The print controller stores or buffers the sheetside bitmaps in accordance with storage capabilities of the particular architecture of a particular print controller. The print controller then forwards the sheetside bitmaps to one or more print engines (sometimes also referred to as an "imaging engine" or as a "marking engine"). The print engines have internal queues for storing the sheetside bitmaps to be printed. A print engine pulls the sheetside bitmaps off of the queue and performs an imaging process to mark the printable medium (e.g., a sheet of paper) with the sheetside bitmaps provided by the print controller. The print engine may comprise a laser print engine, an ink-jet print engine, or another type of imaging system that transfers each sheetside bitmap to corresponding pixels on paper. Generally, the print engine is configured with the printer.

Halftoning is the reprographic technique that simulates continuous tone imagery through the use of strategically spaced dots of varying size. Screening is a type of halftoning method used commonly in practical implementations. A common binary screening method employs a matrix of thresholds replicated to the size of printable area. These replicated matrices are compared to the continuous tone image (CTI) to determine which PELs are on or off. The print controller receives a CTI, such as a digital picture, from a host. The print controller then uses the screening algorithm to process the CTI and convert the image into an array of pixels. The result of the screening algorithm is a bitmap where each pixel may be on, off, or have multiple drop sizes or exposure levels (e.g., ink or no ink, etc.) which is referred to as a halftone image (HTI). The print controller then sends the halftone image to a print engine for printing.

The print engines may sometimes encounter uniformity errors in printing. These inherent printing errors are referred to as printer artifacts. For example, printer artifacts may include be streaks, "jet outs", non-uniformities, inconsistent ink drop sizes, each of which is associated with the characteristics of the imaging head (e.g., an LED printhead, an ink jet printhead, etc.). In previously disclosed implementations, the print controller compensated for printer artifacts by scanning a printed image of the HTI and comparing the scanned image to the CTI to adjust subsequent prints by using standard halftoning techniques. A few methods attempt to address artifacts that are inherently caused by the print engine design, like error diffusion, but none of the approaches are iterative halftone based. Several prior techniques attempt to reduce artifacts caused by standard screening methodologies. For example the articles "*Model-based color Halftoning using Direct Binary Search*," (A. U. Agar and J. P. Allebach) *IEEE Trans. on Image Processing*, Vol. 14, pp. 1945-1959, December 2005 and "*Colorant-based direct binary search halftoning*" (J Lee and J. P. Allebach), *Journal of Electronic Imaging*, Vol. 11, no. 4, pp. 517-527, October 2002 demonstrate the application of iterative halftones like DBS to compensate for screening artifacts such as non-linear tones, colorant textures. However, these techniques are still susceptible to printer artifacts. Accordingly, there exists a need for improved compensation of printer artifacts.

SUMMARY

Embodiments described herein regard a calibration process to mask printer artifacts via an iterative halftoning search algorithm using an improved direct binary search halftoning. In one embodiment, a printing system is operable to prepare an explicit continuous tone image (CTI) for printing onto a print medium and to compensate for printer inherent artifacts that occur during printing by creating an eventual new screen, which when employed (through the screening procedure) reduces these artifacts to satisfactory levels. The aforementioned CTI comprises the gamut including virtually all of the possible gray levels such that its width dimension spans the entire printable area. The printing system includes a printer and a print controller. The print controller is operable to generate an initial half tone image (HTI) based on the CTI using the screening algorithm, which represents the screens at the gray levels. The print controller is also operable to filter the initial HTI and the CTI with a perceptual filter and determine an error between the filtered CTI and the filtered HTI. The print controller is further operable to print the HTI onto a print medium via the printer to illustrate printer artifacts and process a scanned version of the printed HTI. The print controller also determines an error between the filtered CTI and the scanned HTI to construct a modified version of the HTI (defined as the intermediate HTI) to reduce the error between the filtered CTI and the filtered HTI (e.g., iteratively). The print controller then transfers the updated screen to the printer for halftoning and printing onto the print medium during normal print process. Since the purpose of the updated screen is to reduce artifacts which may appear at any location the halftone screen size spans the width of the printing process.

The updated screen is replicated by the controller along the process direction to accommodate the size of the sheetside to be printed.

It should be also understood that scanning typically blurs the actual image. To account for this, the scanned image can be deconvolved using a Point Spread Function for the scanner. This deblurred scanned image is then used instead of the scanned image. Furthermore the scanned image typically is not at the device resolution which is used for the halftoning. The scanned image is converted to the device space resolution using operations such as nearest neighbor or bicubic interpolation. Similarly the CTI may require conversion to a device space resolution. This preprocessing procedure is not constrained and other types of preprocessing procedures to convert the input and scanned images into device native image resolution may be used.

The print controller, in determining an error between the CTI and the scanned HTI, may swap a pixel of the intermediate HTI with a neighbor pixel of the intermediate HTI and determine a swap error between the corresponding swapped pixel of the intermediate HTI and a corresponding pixel of the CTI. The print controller, in determining an error between the CTI and the intermediate HTI, may toggle a pixel of the intermediate HTI and determine a toggle error between the toggled pixel of the intermediate HTI and a corresponding pixel of the CTI. The print controller, in determining an error between the CTI and the scanned HTI, may determine a minimum error between the toggle error and the swap error. The print controller, in processing a scanned version of the printed HTI, may update the error between the filtered CTI and the filtered HTI with the minimum error to reduce the error between the filtered CTI and the filtered HTI. The print controller, in processing a scanned version of the printed HTI, may update the intermediate HTI on a pixel by pixel basis.

The CTI typically uses 8-bit or higher gray values and wherein the HTI may include fewer gray values typically 1 or 2-bit. The print controller, in generating the HTI based on the CTI, halftones the CTI by applying a screening algorithm to the CTI. The perceptual filter may employ a Human Visual System model.

In another embodiment, a method of printing with reduced printer artifacts provides for processing a CTI to generate an initial HTI, filtering the CTI and the initial HTI with a perceptual filter, determining an error between the filtered CTI and the filtered HTI. The method also provides for printing and scanning the HTI, wherein the printed HTI include printer artifacts. The method also provides for processing the scanned HTI to determine an error between the filtered CTI and the scanned HTI and updating the error between the filtered CTI and the filtered HTI with the error between the filtered CTI and the scanned HTI to update the intermediate HTI and reduce the printer artifacts upon printing. The method also provides for printing the updated new screens with a printer.

In another embodiment, a software module is configured with a computer readable medium embodying a computer readable program for reducing printer artifacts. The computer readable program when executed by a processor causes the processor to process a continuous tone image (CTI) to generate an initial half tone image (HTI), filter the CTI and the initial HTI with a perceptual filter, and determine an error between the filtered CTI and the filtered HTI. The computer readable program also causes the processor to print the HTI, wherein the printed HTI include printer artifacts, process a scanned version of the HTI to determine an error between the filtered CTI and the scanned HTI. The computer readable medium also causes the processor to update the error between the filtered CTI and the filtered HTI with the error between the filtered CTI and the scanned HTI to update the intermediate HTI and generate new screens to reduce the printer artifacts upon further printing.

Other exemplary embodiments may be described below.

DESCRIPTION OF THE DRAWINGS

The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended aid in understanding the principles of the invention, and are to be construed as being without limitation to such specifically recited examples and conditions. As a result, the invention is not limited to the specific embodiments or examples described below, but by the claims and their equivalents.

Figure 1:
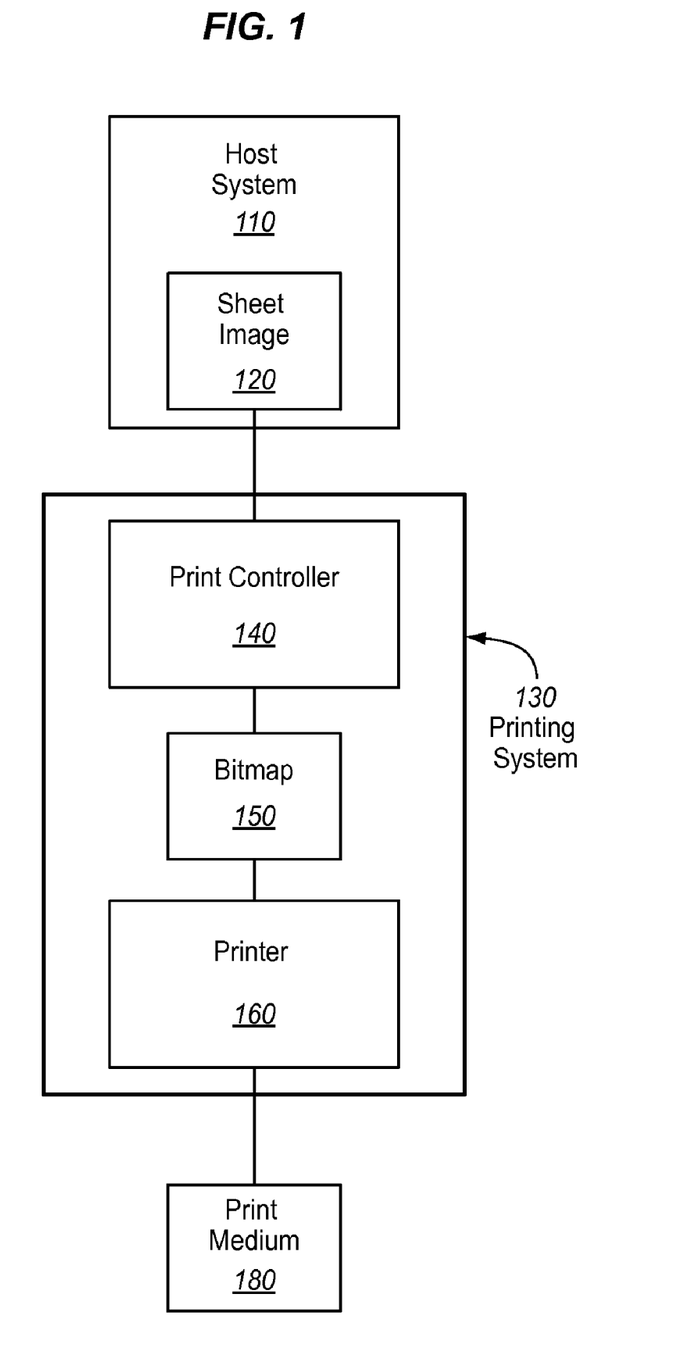
FIG. 1 is a block diagram illustrating a printing system in an exemplary embodiment.

FIG. 1 is a block diagram illustrating a printing system 130 in an exemplary embodiment. A host system 110 is in communication with the printing system 130 to print a sheet image 120 onto a print medium 180 (e.g., paper) via a printer 160. The resulting print medium 180 may be printed in color and/or in any of a number of gray shades, including black and white. The host system 110 may comprise any computing device, such as a personal computer, a server, or even a digital imaging device, such as a digital camera or a scanner. The sheet image 120 may be any file or data that describes how an image on a sheet of print medium should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120.

Figure 2:
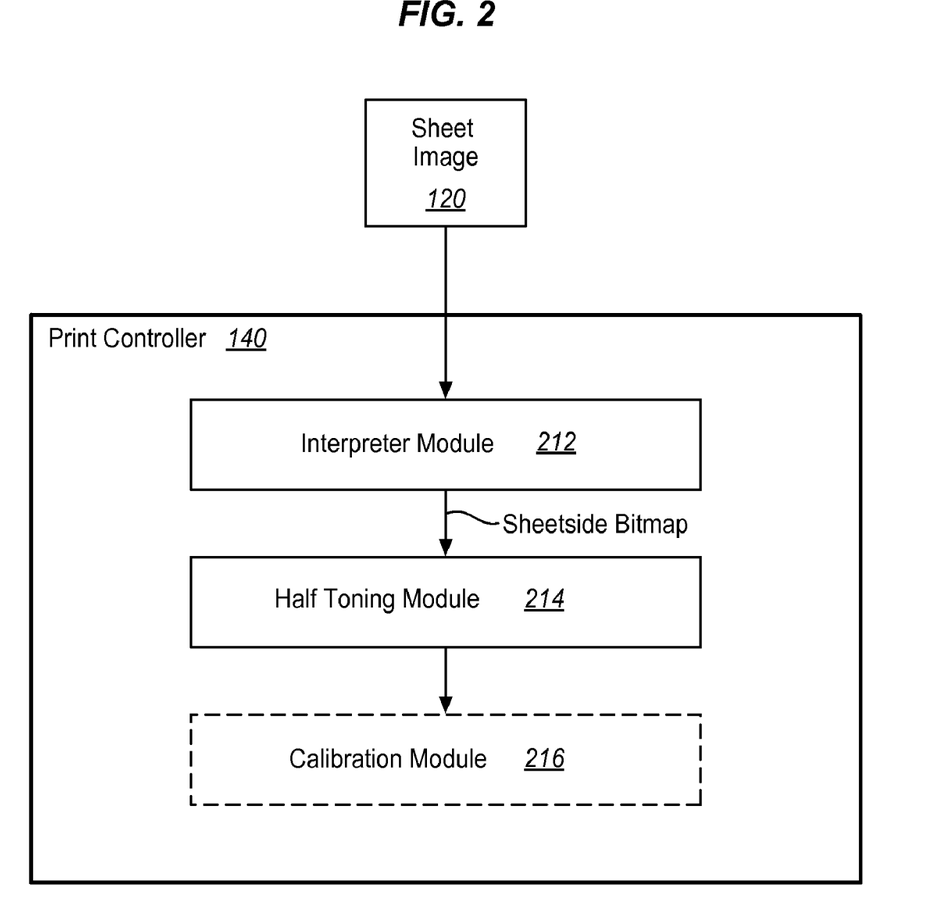
FIG. 2 is a block diagram illustrating a print controller in an exemplary embodiment.

The print controller 140 may be any system, device, software, circuitry and/or other suitable component operable to transform the sheet image 120 for generating the bitmap 150 in accordance with printing onto the print medium 180. FIG. 2 is a block diagram illustrating an exemplary print controller 140. The print controller 140, in its generalized form, includes an interpreter module 212, a halftoning module 214, and an calibration module 216 (calibration module is only used during calibration). These separate components may represent hardware used to implement the print controller 102. Alternatively or additionally, the separate components may represent logical blocks implemented by executing software instructions in a processor of the printer controller 140. Accordingly, the invention is not intended to be limited to any particular implementation as such may be a matter of design choice.

The interpreter module 212 is operable to interpret, render, rasterize, or otherwise convert images (i.e., raw sheetside images such as sheet image 120) of a print job into sheetside bitmaps. The sheetside bitmaps generated by the interpreter module 212 are each a 2-dimensional array of pixels representing an image of the print job (i.e., a CTI), also referred to as full sheetside bitmaps. The 2-dimensional pixel arrays are considered "full" sheetside bitmaps because the bitmaps include the entire set of pixels for the image. The interpreter module 212 is operable to interpret or render multiple raw sheetsides concurrently so that the rate of rendering substantially matches the rate of imaging of production print engines.

The halftoning module 214 is operable to represent the sheetside bitmaps as patterns of ink drops or other dots (e.g., via halftoning techniques in a laser printer). For example, the halftoning module 214 may convert the pixels to a pattern of ink drops for application to the print medium 180 (e.g., paper). Once computed, the halftoning module 214 transfers the converted sheetside bitmaps to print head controllers of the printer 160 to apply the ink drop(s) to the tangible medium 150.

The print controller 102 may further include other modules such as a print job storage system, a raw data preprocessing system, an interpreter system, and a bitmap processing system, etc. The calibration system 216 comprises any hardware, software, firmware, or any combination thereof, operable to compensate for artifacts during calibration process. In one embodiment, calibration system 216 uses a DBS algorithm to compensate for the artifacts.

Figure 3:
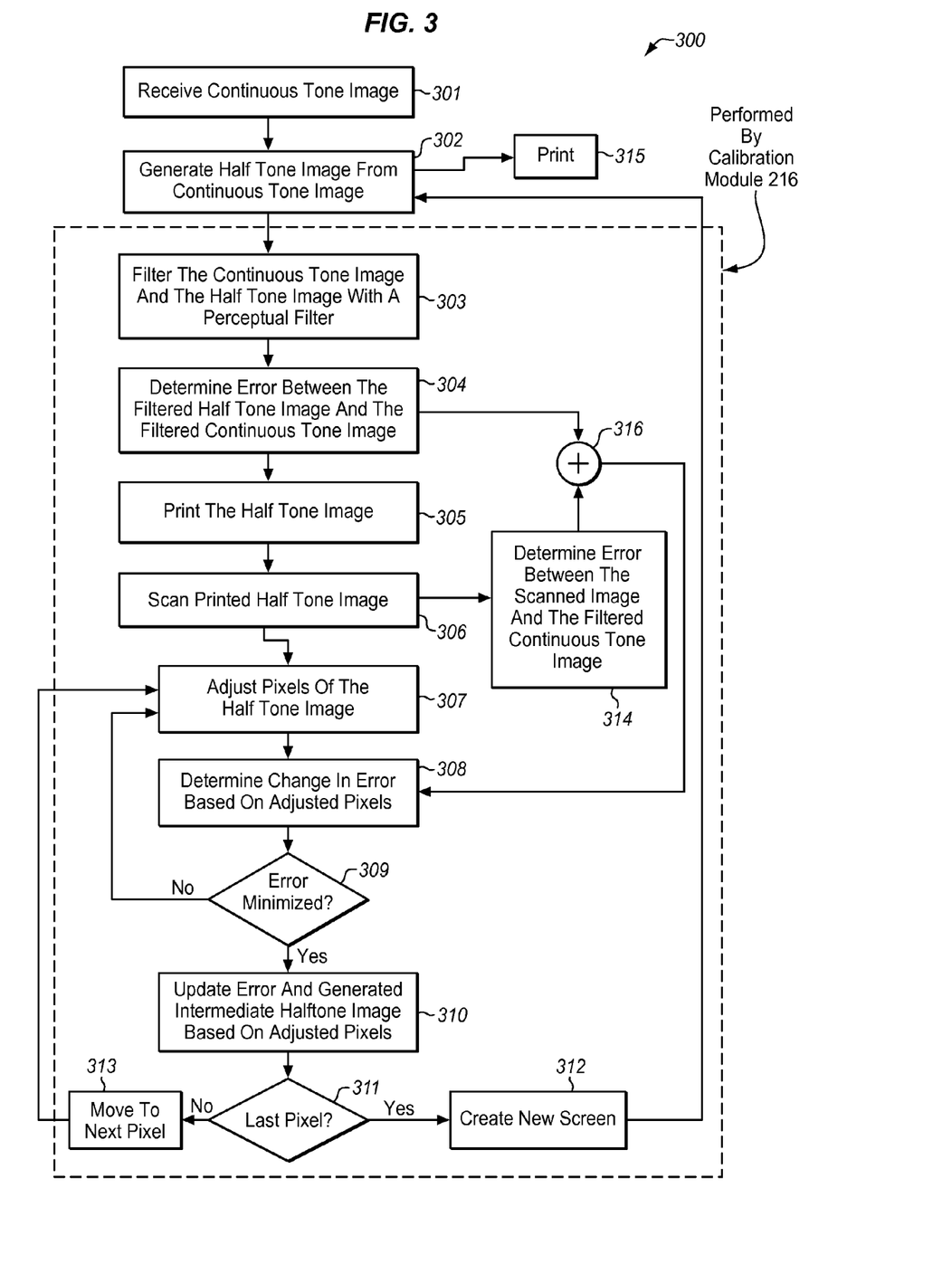
FIG. 3 is a flow chart illustrating a general method of printer calibration in an exemplary embodiment.

The DBS algorithm of this embodiment is an iterative/recursive search heuristic that uses a perceptual filter, such as a Human Visual System (HVS) model, to minimize the perceived difference (error) between a CTI and its corresponding rendered HTI together with the error between the filtered CTI and the scanned HTI. In this regard, the DBS algorithm iteratively computes an intermediate HTI that minimizes the error E according to the following equation:

$$E = \iint [h(x,y)g(x,y) - h(x,y)f(x,y)] dx dy + \iint [h(x,y)\hat{g}(x,y) - h(x,y)f(x,y)] dx dy$$

where $\hat{g}(x,y)$ is the scanned HTI, and $h(x,y)$ is perceptual filter two dimensionally convolved with the CTI and HTI, mathematically represented as $f(x,y)$ and $g(x,y)$, respectively. FIG. 3 is a flow chart illustrating the exemplary DBS algorithm that is used to update the error between the CTI and the HTI based on a scanned printed image to refine the rendered HTI. The resultant intermediate HTI used for halftoning subsequently reduces the number of printer artifacts.

In this embodiment, the print controller 140 receives the CTI (i.e., the sheet image 120) in the process element 301 to initiate processing of the CTI via the interpreter module 212. The interpreter module 212 generates a sheetside bitmap 150 of the CTI. The sheetside bitmap 150 is a color transformed version of the CTI within a color space of the printing system 130. For example, the CTI may have a color space requiring conversion to the smaller color space of the printing system 130. One example of such a color conversion includes CIELab to CMYK color conversion, wherein CIELab is a perceptual color space that may be found in the CTI and CMYK is a smaller color space of the printing system 130 using cyan (C), magenta (M), yellow (Y), and black (K). However, other color conversions exist, such as CIELab to grayscale color conversion.

Once the CTI is received, the halftoning module 214 generates the HTI from the CTI in the process element 302. The halftoning module 214 may use any of a variety of halftoning techniques to generate the HTI. From there, the HTI in the CTI are processed by the calibration module 216. In this regard, the calibration module 216 may filter the CTI and the HTI using the perceptual filter, in the process element 303, to generate perceptually filtered versions of the CTI and the HTI. The calibration module 216 then determines an error between the filtered versions of the CTI and the HTI in the process element 304. Afterwards, the print controller 140 transfers a copy of the HTI to the printer 160 for test printing on the print medium 180 in the process element 305. For example, the printed HTI may be scanned, in the process element 306, for processing by the calibration module 216 to refine the original error E.

To refine the original E, the calibration module 216 processes the intermediate HTI to adjust pixels therein in the process element 307. For example, the calibration module 216 may select a particular pixel within the intermediate HTI and swap that pixel with neighboring pixels or toggle the selected pixel (e.g., flipping a color value of the pixel to an opposite color value). Based on these adjustments, the calibration module 216 may determine a change in the error E. If the error is minimized in the process element 309, the calibration module 216 updates the intermediate HTI with the adjusted pixel (e.g., the calibration module 216 replaces the original pixel of the intermediate HTI with the newly adjusted pixel) in the process element 310.

Accordingly, the calibration module 216 may perform this pixel adjustment and error determination on a pixel by pixel basis and determine whether all of the pixels in the intermediate HTI have been adjusted and had their errors updated in the process element 311. If other pixels in the intermediate HTI are to be processed, the calibration module 216 may move to the next pixel in the process element 313 such that the next pixel may be adjusted in the process element 307 to continue reducing the error E (i.e., on a pixel by pixel basis). If, however, the most recently adjusted pixel is the last pixel in the intermediate HTI to be adjusted, the calibration module 216 transfers the adjusted intermediate HTI to the halftoning module 214 and directly to the printer 160 for printing. For example, once all errors have been minimized for each of the pixels of the scanned HTI and the corresponding pixels of the generated HTI have been appropriately adjusted, the resultant adjusted intermediate HTI is used in the halftoning module 214 to create the screen (process element 312) to generate the final HTI for printing via the printer 160 (process element 315).

Additionally, once the printed HTI is scanned in the process element 306, the error between the scanned image and the filtered CTI is again computed in the process element 314 to update the original error E. For example, the recomputed error between the scanned image and the filtered CTI is added to the original error E between the filtered HTI and the filtered CTI in the process element 316. This value is then used in determining the change in the original error E based on the adjusted pixels in the process element 308.

Figure 4:
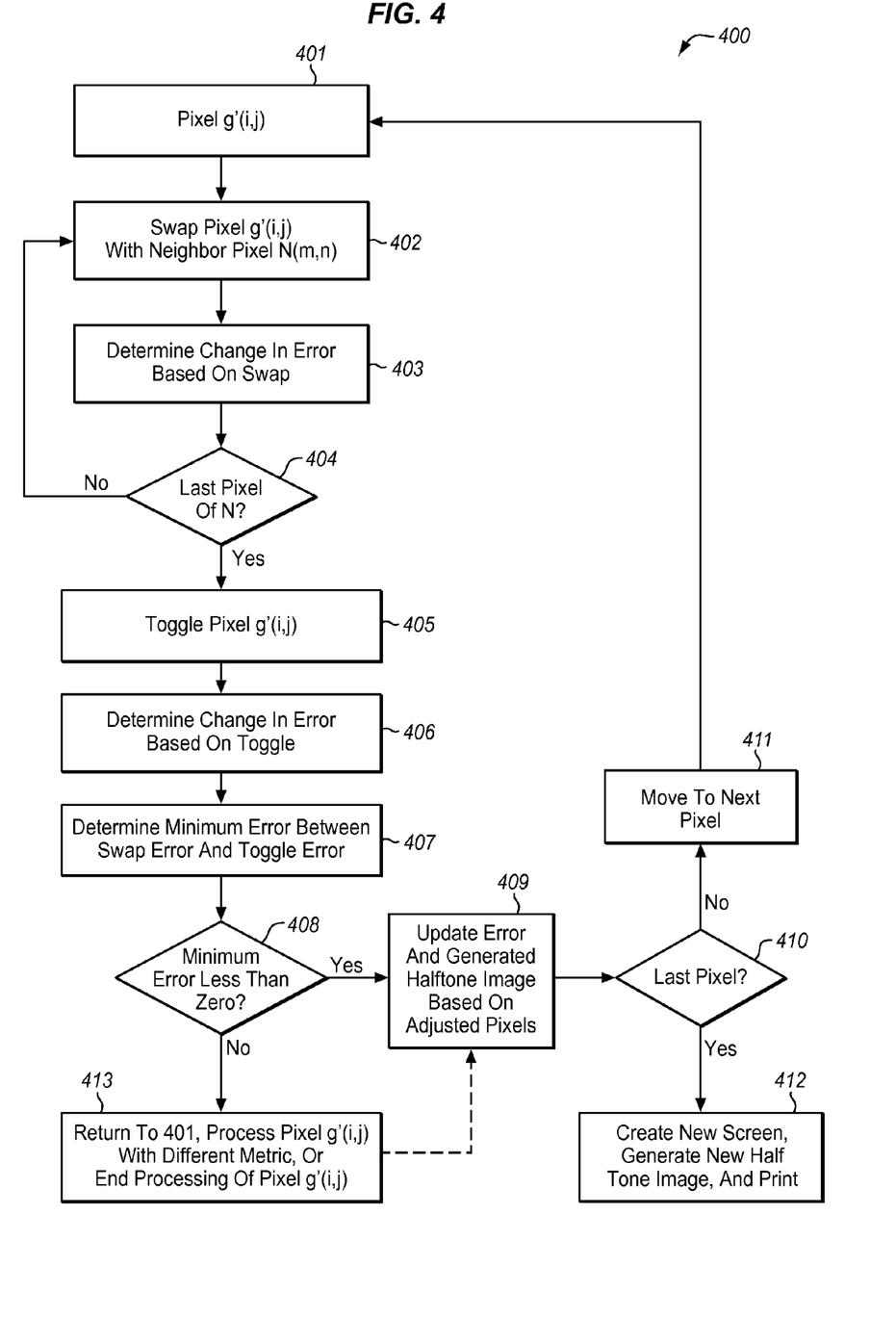
FIG. 4 is a flow chart illustrating additional processes of the printer calibration the FIG. 3 in an exemplary embodiment.

FIG. 4 is a flow chart illustrating additional processes of the printer calibration of FIG. 3 in an exemplary embodiment. For example, the process elements 401-413 of this embodiment may be used to implement the process elements 307-313 of FIG. 3. Thus when the printed HTI is scanned and configured as a digital image for processing by the calibration module 216, adjustment of the pixels in the HTI initiates in the process element 401 at a particular pixel i,j in the two-dimensional pixel field g'(i,j), which is an intermediate HTI, where i and j are integers. From there, the calibration module 216 swaps the pixel g'(i,j) with a neighbor pixel N(m,n), where m and n are also integers, in the process element 402. For example, a particular pixel located i=2, j=2 within the intermediate HTI g', may be surrounded by neighboring pixels N(m,n)=1,1; 1,2; 1,3; 2,1; 2,3; 3,1; 3,2; and 3,3. The calibration module 216 may swap the pixel g'(i,j)=2, 2 with one of the neighboring pixels such that a change in the error E may be determined in the process element 403. That is, the calibration module 216 may compute the difference, or error ($E_{swap}$), between a particular pixel g'(i,j)=2, 2 with its neighboring pixels N(m,n).

Once each of the neighboring pixels have been swapped and their corresponding errors are computed, the calibration module 216 performs a toggle of the center pixel g'(i,j)=2, 2 under examination g'(i,j) in the process element 405. That is, in halftoning imagery, the pixel may be represented by a simple dot or nothing. Whatever that value is for the pixel under examination g'(i,j), its value may be toggled to the opposite value. The calibration module 216, then computes the difference, or error ($E_{toggle}$) with the toggled pixel in the process element 406. With both $E_{swap}$ and $E_{toggle}$ computed, a minimum error between the two may be determined in the process element 407 and used to adjust the original HTI. For example, if the error between $E_{swap}$ and $E_{toggle}$ exceeds some threshold value (e.g., zero) in the process element 408, adjustment of the pixel under examination g'(i,j) may be deemed as minimized. The original error E may then be updated with this minimized error such that the pixel g(i,j) corresponding to the pixel g'(i,j) may be changed to reduce or eliminate any printer artifacts associated with that pixel, in the process element 409. Otherwise, in the process element 413, processing of the pixel g'(i,j) continues by returning to the process element 401 or by some other metric. Alternatively, processing of the pixel g'(i,j) simply ends such that the method returns to the process element 409 where the pixel g(i,j) of the original HTI is updated with no change (i.e., the pixel g(i,j) remains as is).

After updating in the process element 409, the calibration module 216 determines whether there are any remaining pixels g'(i,j) in the intermediate HTI in the process element 410. If additional pixels remain, the calibration module 216 moves to the next pixel in the scanned HTI in the process element 411. For example, the calibration module 216 may increment the value of i and/or j to begin processing on a new pixel within the intermediate HTI. If no other pixels are to be processed in the intermediate HTI, the calibration element 216 transfers the intermediate HTI (i.e., with the pixels g(i,j)) in a screen format to the halftoning module 214 to generate a final HTI and then directly to the printer 160 for printing onto the print medium 180 in the process element 412.

Although shown and described with respect to one embodiment with a particular number of iterations, the invention is not intended to be so limited. Rather, the number of iterations may be selected as a matter of design choice and/or processing capabilities. For example, faster processing capabilities may allow more iterations to be performed on this particular image to further reduce any printer inherent artifacts.

Figure 5:
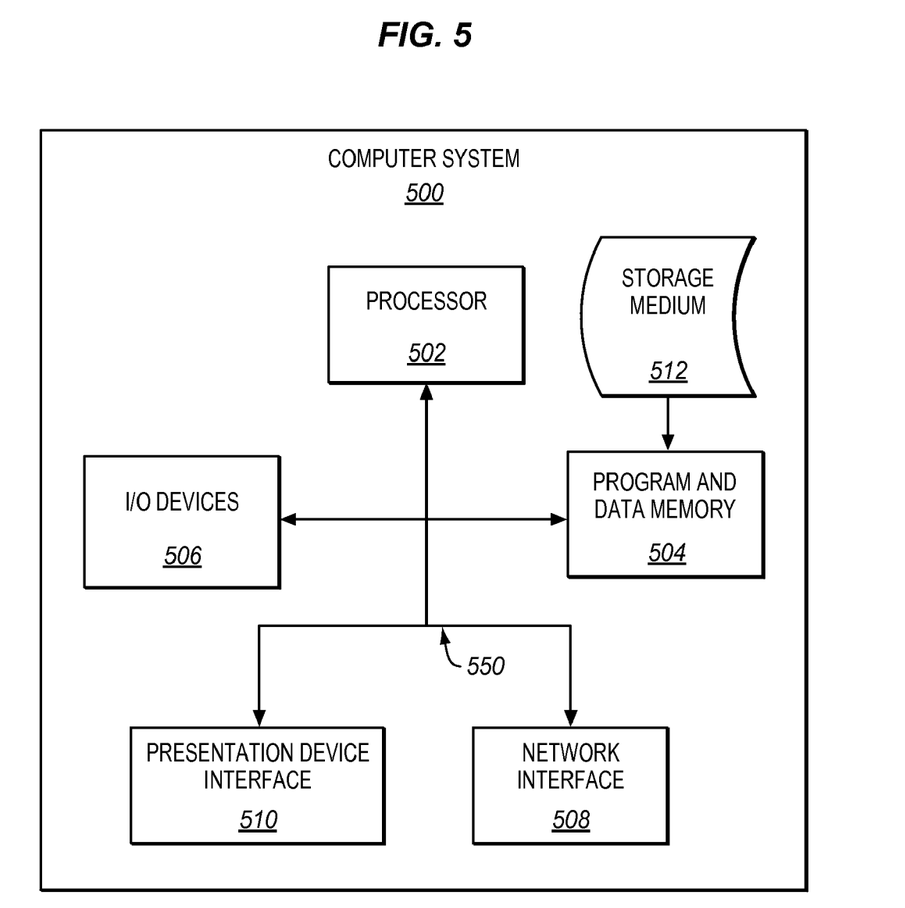
FIG. 5 illustrates a computer system operable to execute computer readable medium embodying programmed instructions to perform desired functions in an exemplary embodiment.

Additionally, embodiments disclosed herein can take the form of software, hardware, firmware, or various combinations thereof. In one particular embodiment, software is used to direct the processor of the print controller 140 to perform the various operations disclosed herein. FIG. 5 is a block diagram depicting a computer system 500 operable to provide features and aspects hereof by executing programmed instructions and accessing data stored on a computer readable storage medium 512.

Furthermore, embodiments of the invention can take the form of a computer program product accessible from a computer-usable or computer-readable medium 512 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A computer system 500 suitable for storing and/or executing program code will include at least one processor 502 coupled directly or indirectly to memory elements 504 through a system bus 550. The memory elements 504 can include local memory employed during actual execution of the program code, bulk storage, and cache memories which provide temporary storage of at least some program code and/or data in order to reduce the number of times code and/or data must be retrieved from bulk storage during execution.

Input/output or I/O devices 506 (including but not limited to keyboards, displays, pointing devices, etc) can be coupled to the system either directly or through intervening I/O controllers. Network adapter interfaces 508 may also be coupled to the system to enable the computer system 500 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 510 may be coupled to the system to interface to one or more presentation device such as printing systems and displays for presentation of presentation data generated by processor 502.

In the context of printing, the invention is not intended to be limited to any particular type of printer. For example, the calibration described herein may be employed in either ink or toner based printers. Moreover, the calibration may be employed in printers ranging in size from small household printers to large commercial printers. In one embodiment, the calibration may be implemented as software instructions operable with a host system (or other computer systems) as opposed to being performed with the print controller to perform calibration. For example, software instructions may direct a processing system, such as a general purpose computer, to generate the HTI and transfer it to the print controller for printing via the printer. Thus, although claimed and described with respect to a print controller, such designations are merely intended to describe the general calibration that may have been traditionally performed by a print controller.

Although specific embodiments were described herein, the scope of the invention is not limited to those specific embodiments. The scope of the invention is defined by the following claims and any equivalents thereof.

We claim:
1. A printing system that compensates print engine artifacts, the printing system comprising:
a print engine;
a print controller operable for:
receiving a specific continuous tone image (CTI) from a host system for printing through the print engine;
generating a half tone image (HTI) based on the CTI, wherein a pixel of the HTI corresponds with one of at least two tones of a color;
sending the HTI to the print engine for printing on a sheet;
receiving a scanned HTI produced by scanning the printed sheet, wherein the printed sheet exhibits the print engine artifacts;
identifying a first error based on the CTI and the HTI;
identifying a second error based on the CTI and the scanned HTI;
updating the HTI to reduce a combination of the first error and the second error; and
generating a new screen to the print engine for printing on another sheet.

2. The printing system of claim 1, wherein the CTI comprises one of a color image and a gray scale image.

3. The printing system of claim 1, wherein generating the HTI based on the CTI comprises screening by applying a screen to the CTI.

4. The printing system of claim 1, wherein generating the HTI based on the CTI comprises:
generating an initial HTI based on the CTI; and
iteratively updating the initial HTI to minimize each error identified based on the CTI and each updated initial HTI at each iterative step.

5. The printing system of claim 1, wherein:
identifying the first error comprises identifying a difference between the CTI and the HTI; and
identifying the second error comprises identifying a difference between the CTI and the scanned HTI.

6. The printing system of claim 1, wherein updating the HTI comprises:
swapping a pixel of the HTI with a neighbor of the pixel to generate an intermediate HTI; and
identifying an intermediate error based on the CTI and the intermediate HTI,
wherein the HTI is updated using the intermediate HTI when a combination of the intermediate error and the second error is reduced from the combination of the first error and the second error.

7. The printing system of claim 1, wherein updating the HTI comprises an approach based on direct binary search comprising:
toggling a pixel of the HTI to correspond with the other tone of the two tones of the color to generate an intermediate HTI; and
identifying an intermediate error based on the CTI and the immediate HTI,
wherein the HTI is updated using the intermediate HTI when a combination of the intermediate error and the second error is reduced from the combination of the first error and the second error.

8. The printing system of claim 1, wherein updating the HTI comprises an approach based on direct binary search comprising:
generating a plurality of intermediate HTIs and by swapping a pixel of the HTI with neighbors of the pixel to generate a subset of the plurality of intermediate HTIs and by toggling the pixel to correspond with the other tone of the two tones of the color to generate another of the plurality of intermediate HTIs;
identifying a plurality of intermediate errors each based on a respective one of the plurality of intermediate HTIs and the CTI;
identifying a plurality of combined errors each combining a respective one of the plurality of intermediate errors and the second error; and
identifying one of the plurality of intermediate HTIs that corresponds with a lowest combined error among the plurality of combined errors, wherein the lowest combined error is reduced from the combination of the first error and the second error,
wherein the HTI is updated using the one of the plurality of intermediate HTIs.

9. The printing system of method 8, wherein identifying the plurality of combined errors comprises applying a human visual system (HVS) to each combination of the respective one of the plurality of intermediate errors and the second error.

10. The printing system of claim 1, wherein updating the HTI comprises an approach based on direct multivariate search comprising:
generating a plurality of intermediate HTIs by swapping a pixel of the HTI with neighbors of the pixel to generate a subset of the plurality of intermediate HTIs and by toggling the pixel to correspond with another pixel size to generate another of the plurality of intermediate HTIs;
identifying a plurality of intermediate errors each based on a respective one of the plurality of intermediate HTIs and the CTI;
identifying a plurality of combined errors each combining a respective one of the plurality of intermediate errors and the second error; and
identifying one of the plurality of intermediate HTIs that corresponds with a lowest combined error among the plurality of combined errors, wherein the lowest combined error is reduced from the combination of the first error and the second error,
wherein the HTI is updated using the one of the plurality of intermediate HTIs.

11. The printing system of claim 1, wherein updating the HTI comprises iteratively updating the HTI over pixels of the HTI to iteratively reduce a combination of the second error and each error identified based on the CTI and each updated HTI at each iterative step.

12. The printing system of claim 11, wherein updating the HTI across pixels of the HTI comprises updating the HTI over a first subset of pixels before updating the HTI over a second subset of pixels, wherein each pixel in the first set of pixels corresponds with a higher combined error than each pixel in the second set of pixels, each combined error at a pixel corresponding with a summation of a first difference between the CTI and the HTI at the pixel and a second difference between the CTI and the scanned HTI at the pixel.

13. The printing system of claim 11, wherein updating the HTI comprises iteratively updating the HTI across the pixels of the HTI again.

14. The printing system of claim 1, wherein the print controller is further operable for:
receiving another scanned HTI produced by scanning the other printed sheet;
repeating the entire process again; and
sending the again updated screen to the print engine for printing on yet another sheet.

15. A computer readable medium tangibly embodying programmed instructions which, when executed by a computer system, are operable to execute a method of compensating print engine artifacts, the method comprising:

receiving a continuous tone image (CTI) from a host system for printing through a print engine, wherein a pixel of the CTI corresponds with one of more than two tones of a color;

generating a half tone image (HTI) based on the CTI, wherein a pixel of the HTI corresponds with one of the more than two tones of the color;

sending the HTI to the print engine for printing on a sheet;

receiving a sheet image produced by scanning the printed sheet, wherein the printed sheet exhibits the print engine artifacts;

identifying a first error based on the CTI and the HTI;

identifying a second error based on the CTI and the sheet image;

updating the HTI to reduce a combination of the first error and the second error; and sending the updated HTI to the print engine for printing on another sheet.

16. The computer readable medium of claim 15, wherein updating the HTI comprises an approach based on direct binary search comprising:

generating a plurality of intermediate HTIs by swapping a pixel of the HTI with neighbors of the pixel to generate a subset of the plurality of intermediate HTIs and by toggling the pixel to correspond with the other tone of the two tones of the color to generate another of the plurality of intermediate HTIs;

identifying a plurality of intermediate errors each based on a respective one of the plurality of intermediate HTIs and the CTI;

identifying a plurality of combined errors each combining a respective one of the plurality of intermediate errors and the second error; and identifying one of the plurality of intermediate HTIs that corresponds with a lowest combined error among the plurality of combined errors, wherein the lowest combined error is reduced from the combination of the first error and the second error, wherein the HTI is updated using the one of the plurality of intermediate HTIs.

17. The printing system of method 16, wherein identifying the plurality of combined errors comprises applying a human visual system (HVS) to each combination of the respective intermediate errors and the second error.

18. A method that compensates print engine artifacts, the method comprising:

receiving a continuous tone image (CTI) from a host system for printing through a print engine, wherein a pixel of the CTI corresponds with one of more than two tones of a color;

generating a half tone image (HTI) based on the CTI, wherein a pixel of the HTI corresponds with one of the more than two tones of the color;

sending the HTI to the print engine for printing on a sheet;

receiving a sheet image produced by scanning the printed sheet, wherein the printed sheet exhibits the print engine artifacts;

identifying a first error based on the CTI and the HTI;

identifying a second error based on the CTI and the sheet image;

updating the HTI to reduce a combination of the first error and the second error; and sending the updated HTI to the print engine for printing on another sheet.

19. The method of claim 18, wherein updating the HTI comprises an approach based on direct binary search comprising:

generating a plurality of intermediate HTIs by swapping a pixel of the HTI with neighbors of the pixel to generate a subset of the plurality of intermediate HTIs and by toggling the pixel to correspond with the other tone of the two tones of the color to generate another of the plurality of intermediate HTIs;

identifying a plurality of intermediate errors each based on a respective one of the plurality of intermediate HTIs and the CTI;

identifying a plurality of combined errors by applying a human visual system (HVS) to each combination of a respective one of the plurality of intermediate errors and the second error; and identifying one of the plurality of intermediate HTIs that corresponds with a lowest combined error among the plurality of combined errors, wherein the lowest combined error is reduced from the combination of the first error and the second error, wherein the HTI is updated using the one of the plurality of intermediate HTIs.

20. The method of claim 18, wherein updating the HTI comprises iteratively updating the HTI over pixels of the HTI to iteratively reduce a combination of the second error and each error identified based on the CTI and each updated HTI at each iterative step, and wherein updating the HTI across pixels of the HTI comprises updating the HTI over a first subset of pixels before updating the HTI over a second subset of pixels, wherein each pixel in the first set of pixels corresponds with a higher combined error than each pixel in the second set of pixels, each combined error at a pixel corresponding with a summation of a first difference between the CTI and the HTI at the pixel and a second difference between the CTI and the sheet image at the pixel.

* * * * *

UNITED STATES PATENT AND TRADEMARK OFFICE
CERTIFICATE OF CORRECTION

PATENT NO. : 8,282,182 B2  
APPLICATION NO. : 12/546445  
DATED : October 9, 2012  
INVENTOR(S) : Chandu et al.

Page 1 of 1

It is certified that error appears in the above-identified patent and that said Letters Patent is hereby corrected as shown below:

In column 13, lines 25-34, the text "7. The printing system of claim 1, wherein updating the HTI comprises an approach based on direct binary search comprising: toggling a pixel of the HTI to correspond with the other tone of the two tones of the color to generate an intermediate HTI; and identifying an intermediate error based on the CTI and the immediate HTI, wherein the HTI is updated using the intermediate HTI when a combination of the intermediate error and the second error is reduced from the combination of the first error and the second error."

should read

-- 7. The printing system of claim 1, wherein updating the HTI comprises an approach based on direct binary search comprising: toggling a pixel of the HTI to correspond with the other tone of the two tones of the color to generate an intermediate HTI; and identifying an intermediate error based on the CTI and the intermediate HTI, wherein the HTI is updated using the intermediate HTI when a combination of the intermediate error and the second error is reduced from the combination of the first error and the second error. --

Signed and Sealed this  
Twenty-fifth Day of December, 2012

David J. Kappos  
*Director of the United States Patent and Trademark Office*